No. 693,976. Patented Feb. 25, 1902.
W. D. LINDSAY.
BAND CUTTING AND FEEDING DEVICE FOR THRESHING MACHINES.
(Application filed Oct. 29, 1900.)
(No Model.) 2 Sheets—Sheet 1.
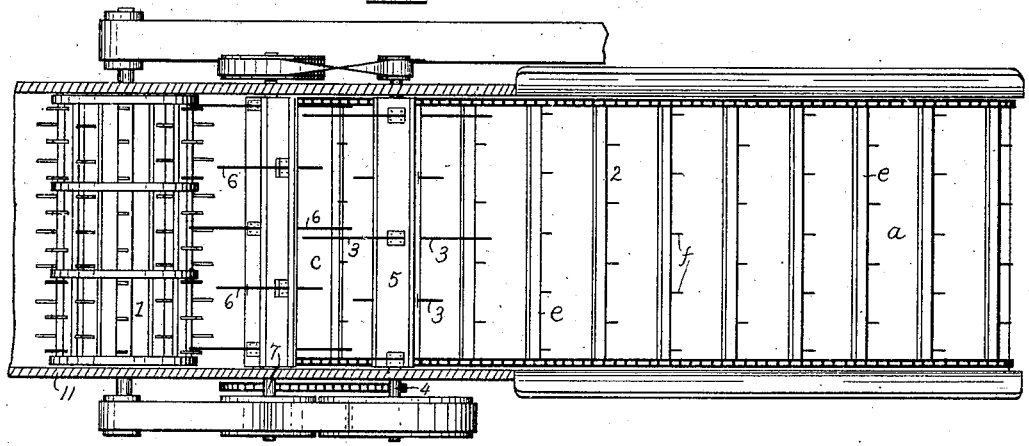
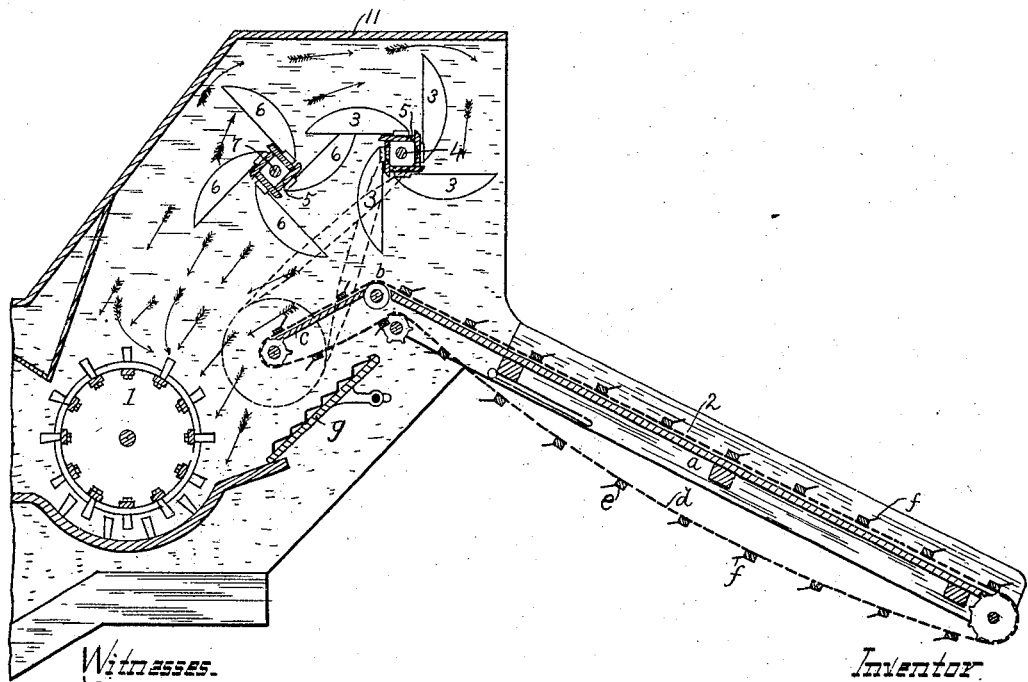

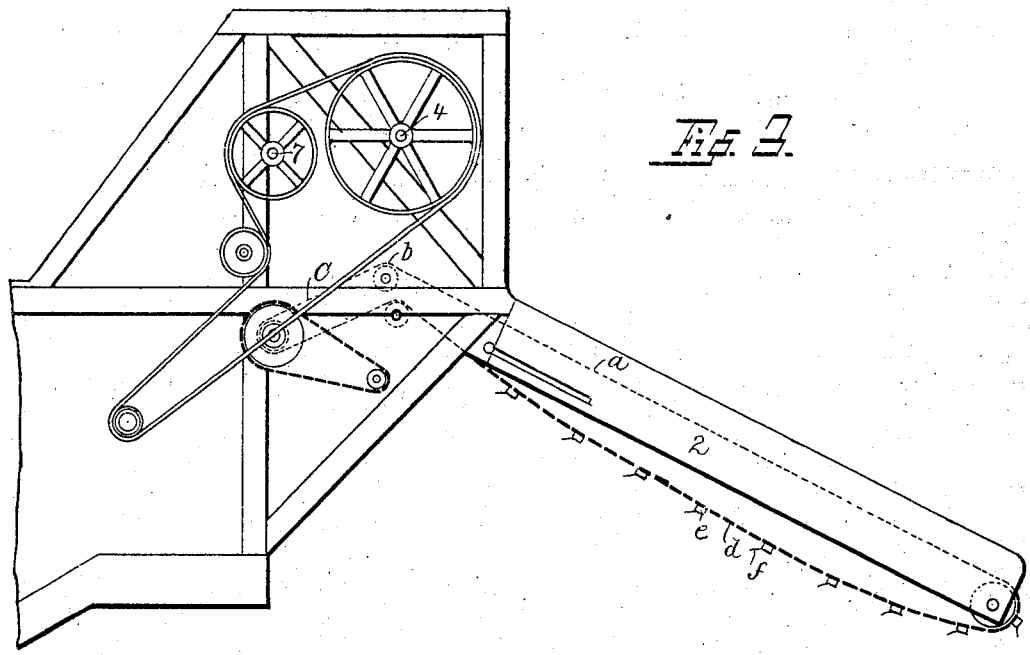
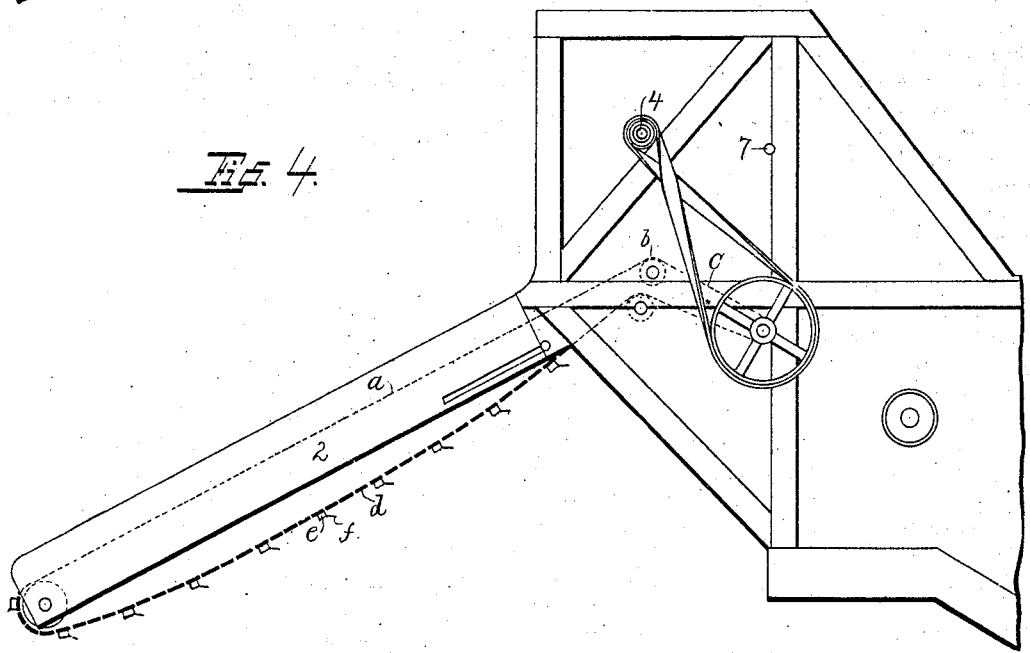

UNITED STATES PATENT OFFICE.

WILLIAM D. LINDSAY, OF MILWAUKEE, WISCONSIN.

BAND-CUTTING AND FEEDING DEVICE FOR THRESHING-MACHINES.

SPECIFICATION forming part of Letters Patent No. 693,976, dated February 25, 1902.

Application filed October 29, 1900. Serial No. 34,760. (No model.)

*To all whom it may concern:*

Be it known that I, WILLIAM D. LINDSAY, a citizen of the United States, residing at Milwaukee, county of Milwaukee, and State of Wisconsin, have invented new and useful Improvements in Band-Cutting and Feeding Devices for Threshing-Machines, of which the following is a specification.

My invention relates to improvements in band-cutting and feeding devices for threshing-machines.

It is well known that in feeding a threshing-machine the bands should not only be cut, but the straw of the bundles should be separated and fed to the cylinder in a continuous stream. Accordingly the custom has been to distribute or separate the straw of the bundles laterally and longitudinally; but I have found by practical experiment that to have unthreshed straw distributed vertically over a considerable portion of the periphery of the cylinder instead of being fed against it in a comparative solid sheet along the line of feed greatly increases the continuity and evenness of feed and also increases the capacity of the cylinder. This is due to the fact that the periphery of the cylinder travels at a very high rate of speed, the movement of the conveyer being extremely slow in comparison therewith, so that when the straw is fed in a solid stream a portion engaging the cylinder-teeth is jerked away from the remainder and a considerable area of the cylinder then passes the line of feed before a further portion of the straw again comes into contact with its teeth. These intervals of successive action and inaction are so rapid as to be nearly imperceptible to the eye; but my experiments have demonstrated that the efficiency is thereby greatly diminished, while by providing for a vertical distribution of the straw over a larger exposed surface of the cylinder a much more even feed is effected and a substantially continuous action of the cylinder is secured. I also find that by thus distributing the unthreshed straw clogging is avoided, as the straw is fed in an exceedingly loose condition.

The objects of my invention are therefore (*a*) to provide for a more effective distribution of the unthreshed straw to the cylinder, with especial reference to both a vertical and longitudinal distribution, and (*b*) to provide means for relieving any congestion or accumulation of straw in front of the cylinder or removing any excessive load on the conveyer under the knives which might otherwise affect the action of the machine.

In the drawings, Figure 1 is a plan view of my invention with the housing of the cylinder and feeding apparatus removed, and Fig. 2 is a longitudinal sectional view of the same, showing the cylinder of the threshing-machine in cross-section. Figs. 3 and 4 are side elevations of my invention, showing the power-transmitting belt connections.

Like parts are identified by the same reference characters in the several views.

1 is the cylinder of a threshing-machine. 2 is a conveyer adapted to deliver the bundles thereto. The conveyer is of a style in ordinary use, being provided with a bundle-receiving section $a$, having an upward pitch to a crown $b$, and a delivery-section $c$, having a downward pitch from the crown to a point near the cylinder. The conveyer-belts $d$, cross-slats $e$, and spines $f$ are also similar to those in ordinary use, and therefore need not be more particularly described.

$g$ is an agitating table or pan adapted to deliver the tailings and litterings to the cylinder.

The band cutting and distributing device is located above the conveyer and consists in two series or sets of revolving blades, each set being located transversely of the conveyer and the rear or inner set being made to revolve at a higher rate of speed than the outer or front set. The blades 3 of the first set, which I will term the "band-cutting" blades, are supported from a shaft 4, a drum or box 5 being used to facilitate their attachment, and the blades 6 of the second set are similarly supported upon a shaft 7, the two shafts 4 and 7 being so located that the blades of the respective sets will interact or lap past each other nearly to the lines of support. The two sets of blades are made to revolve in the same direction, with the downwardly-projecting blades moving in the direction of the conveyer movement, and each blade is so located as to revolve in close proximity to one of the blades of the opposing set, which will of course be moving in the opposite direction on the side of interaction, and thus prevent the straw from winding. The blades of both sets are made with convex cutting edges, and those of the band-cutting set must necessarily be sharp, so as to sever the bands, while those of the other set are preferably sharp or at least thin enough to readily enter the unthreshed straw. The shaft 4 of the band-cutting set is located above and a little in front of the crown *b* of the conveyer, while the shaft 7 of the other set is located approximately over the rear or discharge end of the conveyer, the two sets of blades being so arranged with reference to the conveyer 2 and cylinder 1 that the bands will be cut and the straw partially distributed by the first set of blades, while those of the second set will strip straw rapidly from the conveyer and distribute it over the opposing surface of the cylinder, as indicated by the arrows in Fig. 2, the conveyer holding back all straw not stripped away from it by the blades and delivering the remainder to the lower portion of the cylinder. To accomplish this result, it is necessary that the distributing-blades should be revolved at a much higher rate of speed than the conveyer. In machines heretofore constructed by me the distributing-blades, supported from the shaft 7, are revolved at a speed of about four hundred and fifty revolutions per minute; but a considerable variation from this speed may be had, dependent to some extent upon the character of the straw in the locality where the machines are to be used and also to some extent upon the length of the blades or the diameter of the circle of revolution. I do not, therefore, limit the scope of my invention to any specific rate of speed, as it will be understood that any speed sufficient to centrifugally separate and project the straw against the cylinder by centrifugal action is within the scope of my invention. These distributing-blades coöperate with the conveyer, which to attain the best results should be formed with spines or equivalent projections adapted to enter the straw of the bundle and prevent the entire bundle from being thrown by the blades against the cylinder in a mass. The distributing-blades are located in such proximity to the cylinder that the straw can be thrown by the former to the latter, and the space between the blades and the opposing face of the cylinder is open and unobstructed by any shields, guard, fingers, beaters, or detainers, as all these tend either to compress or accumulate the straw. It is also desirable that the distributing-blades should interact with those of the band-cutting set, for the straw is thus stripped from the blades of the latter as well as from the conveyer-teeth or spines, as the blades of the band-cutting set also move at less speed than the distributing-blades. It will thus be observed that the principle of my invention is in direct opposition to that of the devices in ordinary use, which employ detainers for holding back a portion of the straw or beaters, which compress the straw and deliver it to the cylinder in a comparatively compact stream, while in my device instead of being detained its movement is accelerated as soon as the bands are cut, and the straw is shaken up and distributed to the cylinder in a manner resembling a spray.

An examination of the teeth of a threshing-cylinder and concaves after the same have been in use shows that the points of the cylinder-teeth and the bases of the concave-teeth receive nearly all the wear whether the machine is fed by hand or by feeding devices such as were heretofore used. This demonstrates that notwithstanding the fact that the teeth of threshing-cylinders are from fifteen to over twenty inches apart in their annular line of rotation yet the high speed of the cylinder does not allow the conveyer to deliver any considerable quantity of straw between the cylinder-teeth, but nearly all of it is caught by the ends of the teeth and jerked away from the feeder. With my construction, however, the straw is separated and thrown to the cylinder, and a much larger percentage of it passes between the teeth, thus increasing the efficiency of the individual teeth by delivering the straw between them, as well as adding to the capacity of the cylinder in distributing the straw to all the teeth.

A further object attained by my construction and the described arrangement of the parts is that whenever the straw tends to accumulate in the space between the cylinder and the distributing-blades or in case an excessive quantity of straw is drawn by the conveyer under the blades a portion of such straw is thrown upwardly and forwardly and returned to the conveyer over the blades, as also indicated by arrows in Fig. 2. This occurs before any accumulation takes place sufficient to materially interfere with the action of the cylinder and, owing to the greatly-increased efficiency of the cylinder where the straw is distributed as above described, it will only take place occasionally, as when several large bundles are fed simultaneously. Hence by thus relieving the surplus for a short period there need be no cessation of the feed under ordinary conditions. It will of course be understood that the housing 11 of the cylinder is extended over the cutting and distributing blades substantially as shown in Fig. 2 in order to prevent the straw from being thrown out of the machine. It will also be understood that the blades of the band-cutting and distributing devices are driven at the desired speed from the source of power through the medium of belts and pulleys, as shown, or any other power-transmitting connections.

Having thus described my invention, what

I claim as new, and desire to secure by Letters Patent, is—

1. The combination with the threshing-cylinder of a threshing-machine; a conveyer for the unthreshed straw; a set of revolving blades adapted to cut the bands of the bundles carried by the conveyer; another set of blades arranged and adapted to freely enter the straw, and revolved at such speed as to lift and distribute the same centrifugally; said last-mentioned set of blades being arranged with a free and unobstructed space between the same and the larger portions of the front and upper surface of the cylinder of such dimensions, that the centrifugally-distributed straw will reach the cylinder in a vertically-separated condition.

2. The combination of a conveyer for unthreshed straw, provided with bundle-engaging projections; a set of revolving blades adapted to cut bands while the bundles are being carried by the conveyer; another set of blades arranged and adapted to freely enter the straw and revolved at such speed as to lift, distribute and project the same centrifugally; a threshing-machine casing, formed with an unobstructed receiving-throat, leading to the thresher; and a threshing-cylinder so located as to receive the projected straw in a vertically-separated condition upon its front and upper surface.

3. The combination with the threshing-cylinder of a threshing-machine; a conveyer for the unthreshed straw, having bundle-holding projections; a set of revolving blades adapted to cut the bands of the bundles carried by the conveyer; another set of blades arranged and adapted to interact with the blades of the first-mentioned set, and to freely enter and lift the straw, said last-mentioned blades being revolved at such speed as to lift and distribute the straw centrifugally, and the cylinder and blades being located in such relation that the former will receive the straw distributed by the latter while such straw is separated by centrifugal force.

4. The combination with the threshing-cylinder of a threshing-machine; of a conveyer for the unthreshed straw, provided with bundle-holding projections; a plurality of sets of revolving interacting blades, each set being arranged transversely of the conveyer, and adapted to freely enter the straw carried thereby, and with one of said sets located approximately over the discharge end of the conveyer, and revolved at such speed as to lift and distribute the straw centrifugally over the opposing surface of the cylinder with sufficient space between the cylinder and the blades of the last-mentioned set to permit the centrifugal distribution of the straw over a maximum cylinder-surface.

5. The combination with the threshing-cylinder of a threshing-machine; of a conveyer for the unthreshed straw, extending in two directions from an intermediate point or crown, and provided with bundle-holding projections; a set of revolving blades located slightly ahead and above the crown of the conveyer, and adapted to cut the bands of the bundles carried over the crown of the conveyer; and a second set of blades located approximately over the discharge end of the conveyer, and adapted to freely enter the unbound bundles, said second set of blades being revolved at such speed as to lift the straw and distribute the same centrifugally over the opposing surface of the cylinder.

6. The combination with the threshing-cylinder of a threshing-machine; of a conveyer for the unthreshed straw, extending in two directions from an intermediate point or crown; a set of revolving band-cutters arranged transversely of the conveyer; a set of distributing-blades arranged to interact with the band-cutters, and adapted to freely enter the unbound bundles, said distributing-blades being driven at a comparatively high rate of speed with reference to the conveyer, and at a sufficient speed to lift the straw vertically and distribute the same centrifugally over the exposed surface of the cylinder, the space between said blades and the front and upper surfaces of said cylinder being unobstructed and of such dimensions as to permit said distribution.

7. The combination with the threshing-cylinder of a threshing-machine; of a conveyer for the unthreshed straw; a transverse set of revolving band-cutting blades; a second set of revolving distributing-blades arranged to interact or lap past the blades of the first-mentioned set, and adapted to freely enter and lift the straw; and a housing covering the cylinder and blades, with an unobstructed space between the blades and the front and upper portions of the cylinder, said blades being located to coöperate with the conveyer in delivering the straw to the cylinder, and revolved at such speed as to lift and distribute the straw centrifugally over the latter, and to return any excess of straw over the blades of the first-mentioned set, which might otherwise interfere with the centrifugal distribution of the remainder.

8. The combination with the threshing-cylinder of a threshing-machine; of a conveyer for the unthreshed straw; a plurality of sets of revolving blades, each set being arranged transversely of the conveyer, with its members arranged to interact or lap past the blades of another set, into close proximity with the line of support for such other set of blades, and each member being located in a plane adjacent to the plane of one member of the other set and in proximity thereto, said second set of blades being so located, and revolved at such speed, as to throw the straw in divergent lines to the cylinder.

9. The combination with the threshing-cylinder of a threshing-machine; of a conveyer for the unthreshed straw; a plurality of sets of revolving blades located and adapted to interact or lap past each other, and to freely enter the straw upon the conveyer, the blades of one set being revolved at a high speed and arranged with an open, unobstructed space between them and the cylinder, adapted to permit the straw to be distributed centrifugally from the blades to the cylinder, said blades being adapted to coöperate with the conveyer in distributing the straw.

In testimony whereof I affix my signature in the presence of two witnesses.

WILLIAM D. LINDSAY.

Witnesses:
LEVERETT C. WHEELER,
JAS. B. ERWIN.